(12) United States Patent
Capurso et al.

(10) Patent No.: US 7,104,448 B2
(45) Date of Patent: *Sep. 12, 2006

(54) DOCKING STATION FOR WRITING TO ELECTRONICALLY WRITABLE DISPLAY

(75) Inventors: Robert G. Capurso, Bergen, NY (US); Stanley W. Stephenson, Spencerport, NY (US); James M. Papa, Rochester, NY (US); Gary M. Spinelli, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 493 days.

This patent is subject to a terminal disclaimer.

(21) Appl. No.: 10/282,806

(22) Filed: Oct. 29, 2002

(65) Prior Publication Data

US 2004/0080477 A1  Apr. 29, 2004

(51) Int. Cl.
*G06F 19/00* (2006.01)
(52) U.S. Cl. .................. 235/385; 235/383; 235/378; 235/440
(58) Field of Classification Search ............ 235/385, 235/378, 383, 440; 281/15.1; 340/5.91, 340/815.4; 283/81; 345/1.2, 50–51, 204; 349/1; 705/1, 20, 22, 28; 428/1.1
See application file for complete search history.

(56) References Cited

U.S. PATENT DOCUMENTS

| | | | |
|---|---|---|---|
| 5,111,196 A * | 5/1992 | Hunt .................. 340/5.91 |
| 5,241,467 A * | 8/1993 | Failing et al. .......... 705/1 |
| 5,288,980 A | 2/1994 | Patel et al. .......... 235/381 |
| 5,290,066 A | 3/1994 | Mody .............. 281/15.1 |
| 5,751,257 A * | 5/1998 | Sutherland .......... 345/1.2 |
| 6,201,587 B1 | 3/2001 | Sakamaki ............ 349/86 |
| 6,269,342 B1 * | 7/2001 | Brick et al. ........... 705/20 |
| 2001/0007484 A1 | 7/2001 | Sakamaki |
| 2001/0015788 A1 | 8/2001 | Mandai et al. |
| 2001/0020935 A1 * | 9/2001 | Gelbman ............ 345/173 |
| 2002/0135707 A1 | 9/2002 | Stephenson ......... 349/12 |

OTHER PUBLICATIONS

U.S. Appl. No. 10/134,185, filed Apr. 29, 2002 by Stephenson et al.

* cited by examiner

*Primary Examiner*—Daniel Stcyr
*Assistant Examiner*—Daniel A. Hess
(74) *Attorney, Agent, or Firm*—Kathleen Neuner Manne; Lynne M. Blank

(57) ABSTRACT

A docking station for reading and writing an electronically writable return reminder tag located on a surface of a rental item, the rental item or the return reminder tag having locating features and the return reminder tag including an electronically writable bistable display, a machine readable code identifying the rental item, and a plurality of conductive pads located on the front side of the tag for writing to the display, includes a body defining complementary locating features for locating the rental item bearing the return reminder tag with respect to the docking station; a scanner for scanning the machine readable code on the return reminder tag; and a plurality of contact pins for contacting the conductive pads of the return reminder tag.

29 Claims, 7 Drawing Sheets

DOCKING STATION FOR WRITING TO ELECTRONICALLY WRITABLE DISPLAY

FIELD OF THE INVENTION

The present invention relates to a structure having an electronically writable display with front electrical contacts.

BACKGROUND OF THE INVENTION

Currently when an item is rented from any rental store such as a pre-recorded video cassette, DVD, or video game, the customer is given verbal instructions indicating the date of return. The return information can also be written on the receipt, which is usually tossed out by the customer. Very often, however, the customer forgets the verbal instructions as well as loses track of the receipt which states the return date and time. When the rented item is returned late to the rental store, substantial monetary penalties are charged.

Pending U.S. Ser. No. 10/134,185 filed Apr. 29, 2002 by Stephenson et al. proposes a programmable return reminder tag having a bistable liquid crystal display for displaying return data and a Universal Product Code (UPC) bar code, wherein the information programmed in the display remains on the display in the absence of power. The return reminder tag has a set of electrical contacts on the front side of the display.

U.S. Pat. No. 6,201,587, issued Mar. 13, 2001 to Sakamaki shows a writable liquid crystal display for a video cassette that indicates the contents of the cassette. An indexing apparatus includes a body having an aperture for receiving the cassette, a thermal print head for writing information on the display and an operator interface including a display and operation knobs on the front of the indexing apparatus. The problem with such an indexing apparatus is that it is suitable only for writing on a display on only one particular type of cassette.

There is a need therefore for a writer that can be used to write on a display tag affixed to a video cassette, a DVD, or a video game case.

SUMMARY OF THE INVENTION

The need is met according to the present invention by providing a docking station for reading and writing an electronically writable return reminder tag located on a surface of a rental item, the rental item or the return reminder tag having locating features and the return reminder tag including an electronically writable bistable display, a machine readable code identifying the rental item, and a plurality of conductive pads located on the front side of the tag for writing to the display, that includes a body defining complementary locating features for locating the rental item bearing the return reminder tag with respect to the docking station; a scanner for scanning the machine readable code on the return reminder tag; and a plurality of contact pins for contacting the conductive pads of the return reminder tag.

ADVANTAGES

The invention provides a label writer that can be used with writable labels provided on a variety of different sized containers.

DETAILED DESCRIPTION OF THE INVENTION

Figure 1:
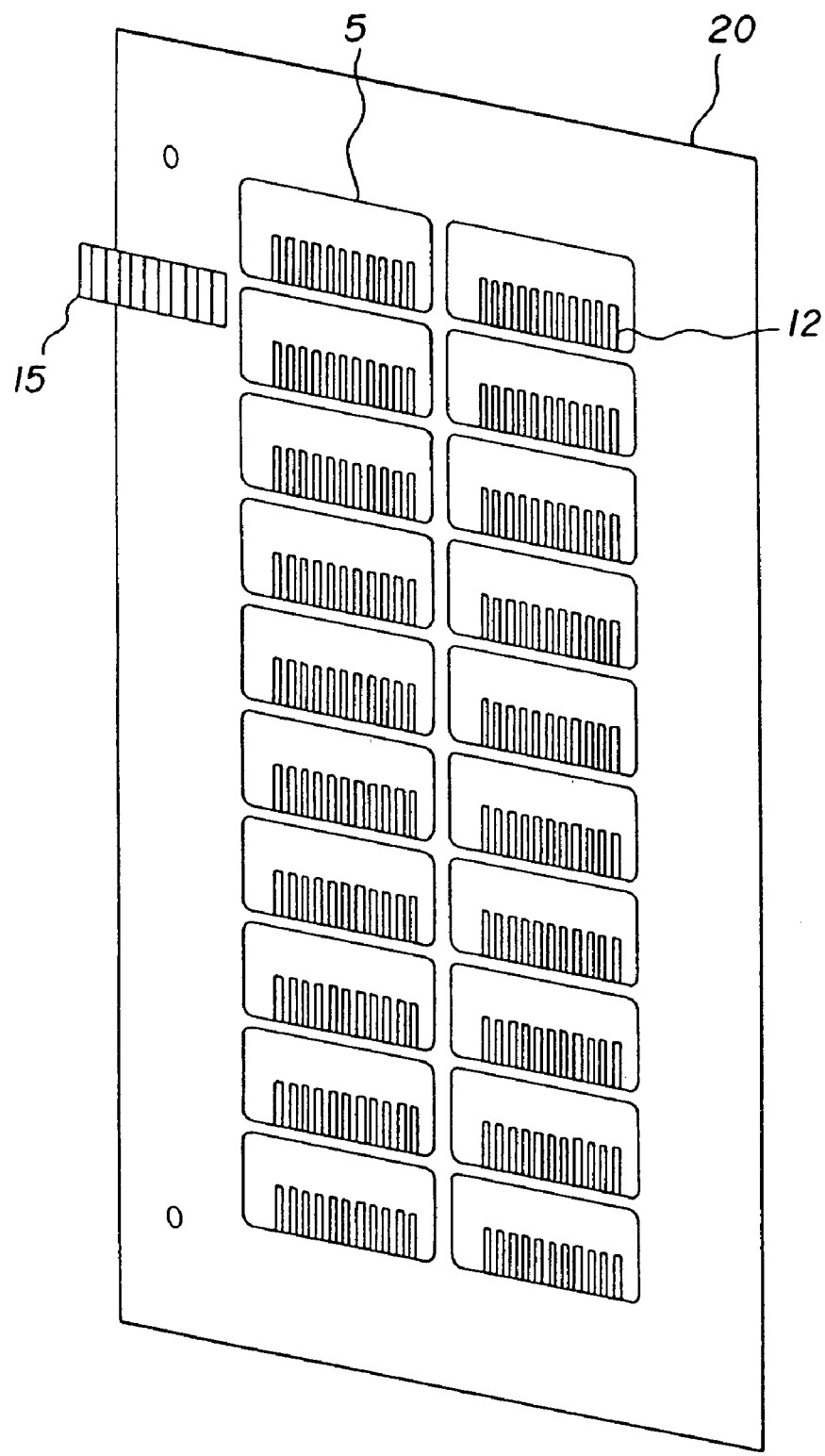
FIG. 1 shows an exploded view of an adhesive backed printable sheet with a plurality peel off return reminder label and a display ready to be attached with conductive adhesive.
Figure 2:
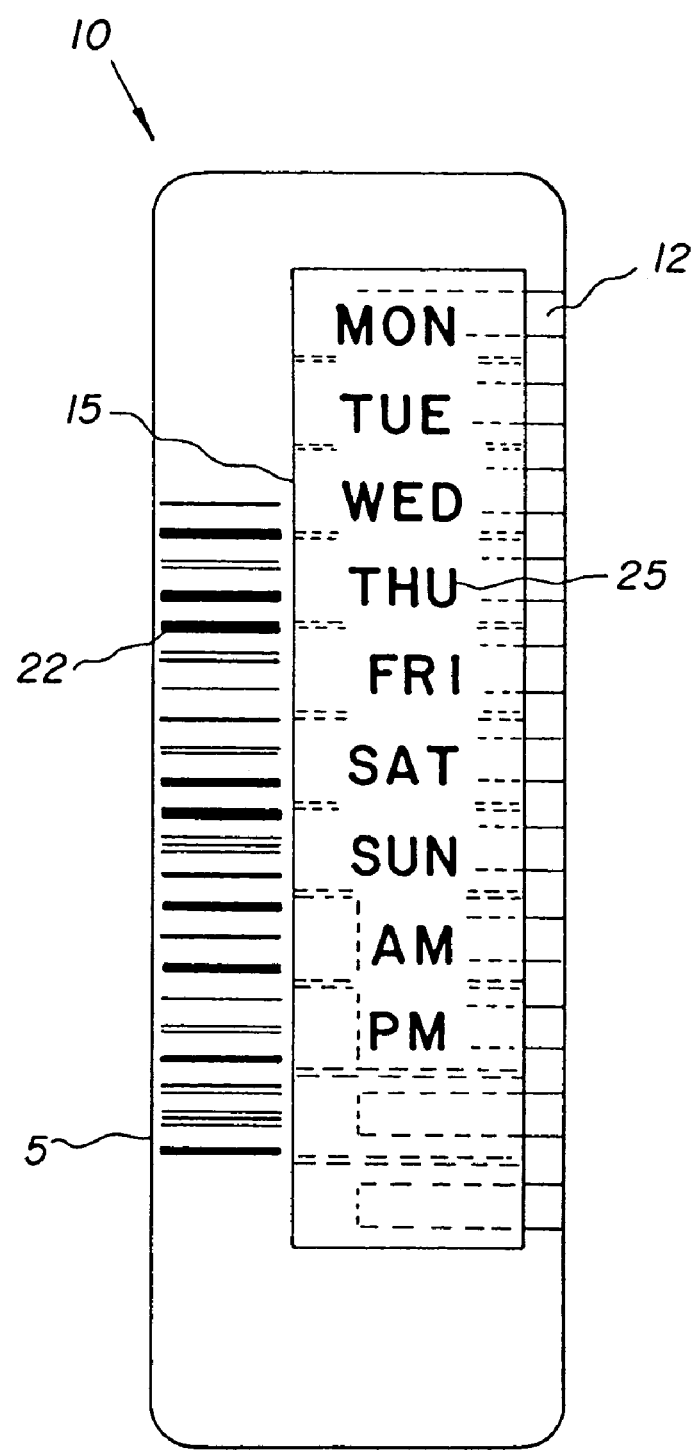
FIG. 2 is a front view of an individual return reminder tag with the display attached to a label having a printed bar code.

Referring to FIGS. 1 and 2, an array of die cut labels 5 on a printable sheet 20 with an adhesive backing are shown. A display 15 with a conductive adhesive backing is shown ready to be attached to one of the die cut labels 5. Printed on each label 5 is an array of conductive pads 12. Displays 15 are adhered to labels 5 using conductive adhesive such as anisotropically conductive adhesive, and placed over a portion of the conductive pads 12 to complete the assembly of return reminder tag 10. The sheet with the assembled return tags is flexible and can be fed through a standard ink jet or laser printer. As shown in FIG. 2, bar code information 22 is printed on the front side of return tag 10 before the assembled return tag is removed from the sheet 20. The bar code 22 uniquely identifies the return reminder tag 10, and can be associated in a database as described below with an identification of the particular rental item that the tag will be attached to. The return reminder tag 10 includes one or more displays 15 having patterned conductive character elements 25 over a layer of polymer stabilized liquid crystal material. The displays 15 can be made as shown in U.S. Ser. No. 10/134,185, referenced above. As shown in FIG. 2, the day and time information displayed on bistable display 15 is depicted as alphabetic characters, but alternatively can be expressed as the standard numeric character designation for day, month, year or time of day.

Figure 3:
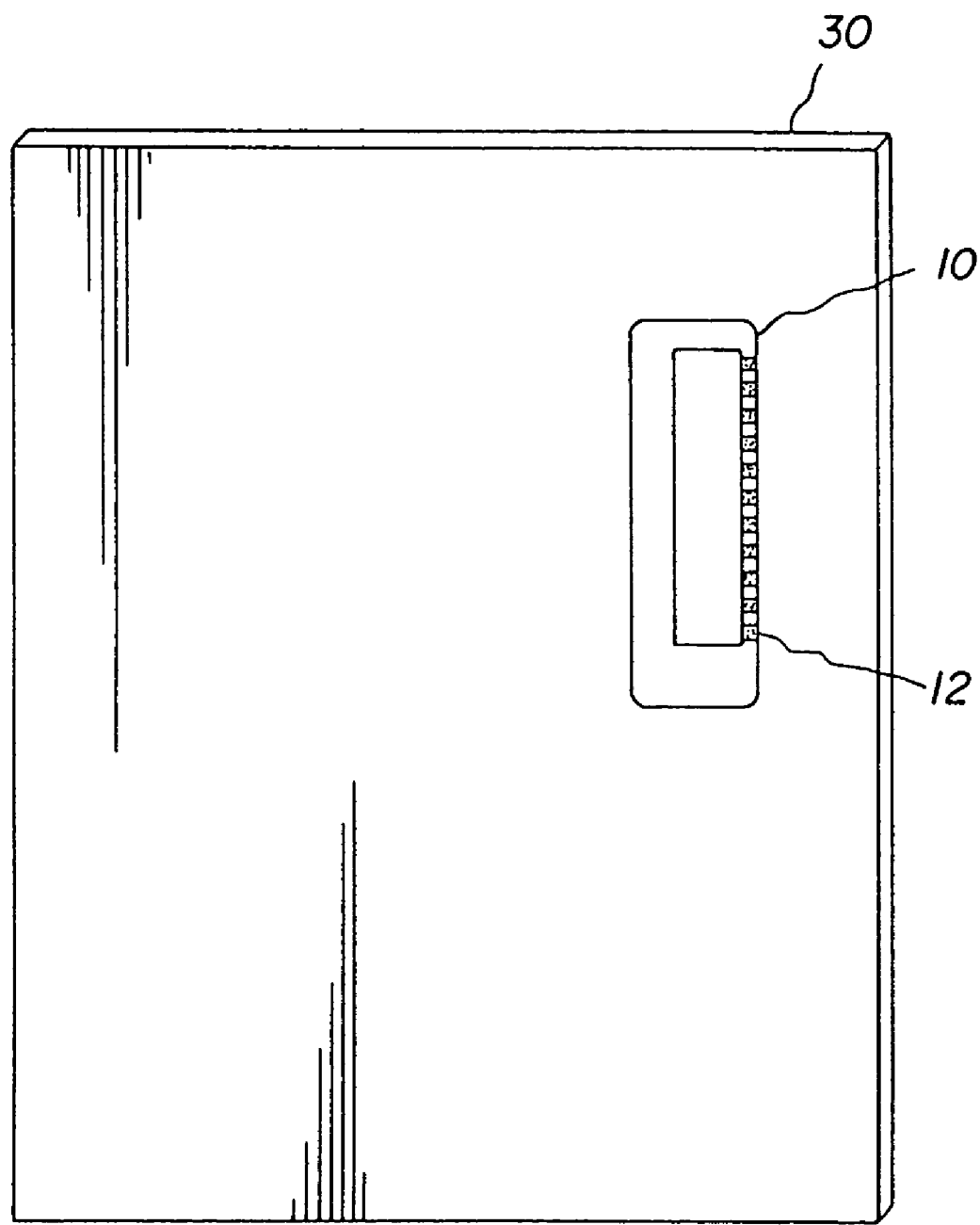
FIG. 3 is a perspective view of a rental item with a return reminder tag attached.

The completed return reminder tag 10 is adhered to a rental item 30 as shown in FIG. 3. Conductive pads 12 and the unique bar code 22 are accessible from the front of the return reminder tag 10. The bar code can be scanned to identify the rental item and an electrical signal can be applied to the conductive pads 12 to change the reflective state of character elements 25 to indicate a day and time for return of the item to a rental outlet.

Figure 4:
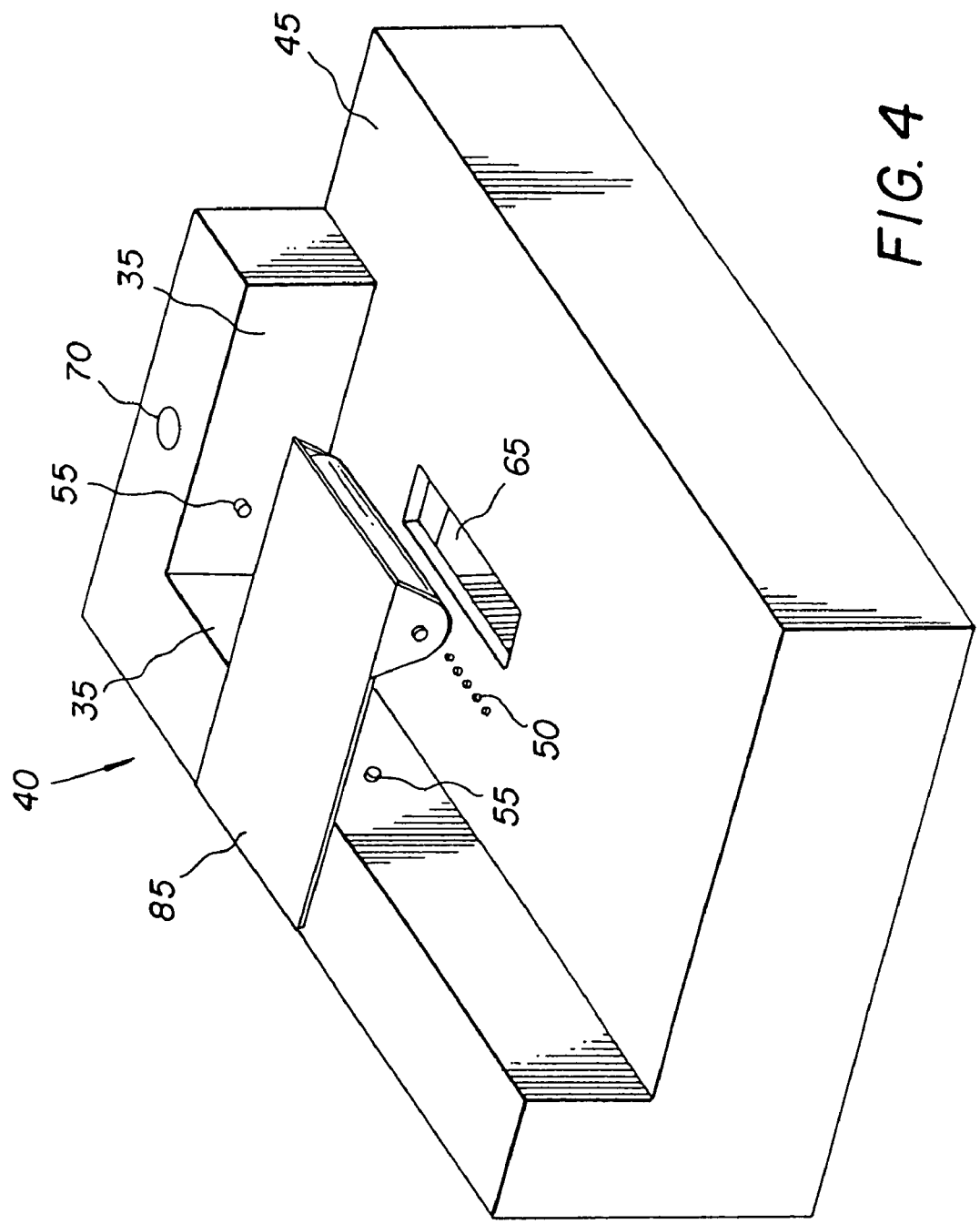
FIG. 4 is a perspective view of a return reminder docking device according to the present invention showing the plurality of contact pins for changing the information on the return reminder tag, an opening in the docking device for viewing the bar code on the return reminder tag, and a biasing spring and roller.
Figure 5:
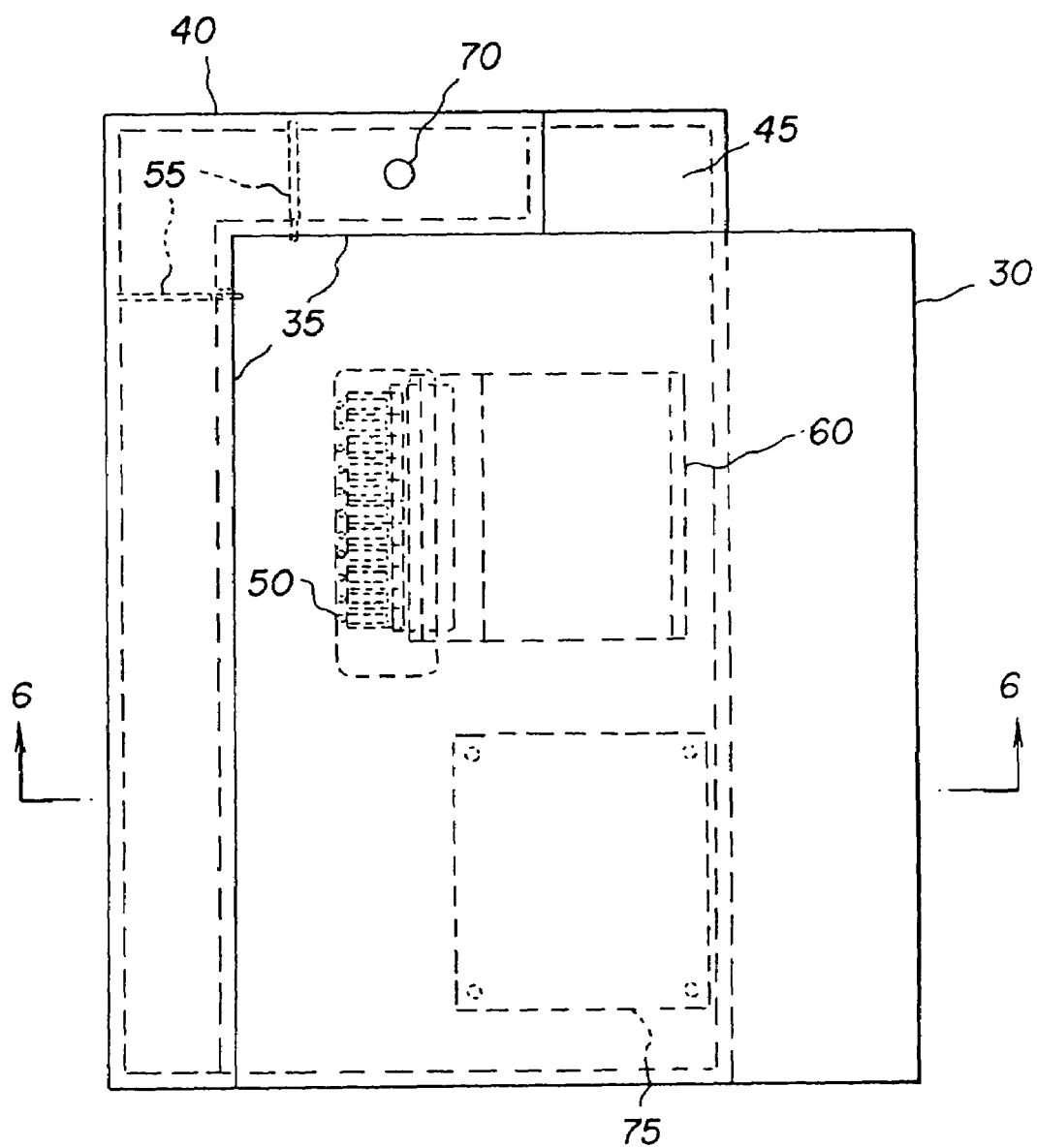
FIG. 5 is a top view of the docking device with the rental item in place and bias spring and roller removed.

Referring to FIGS. 4 and 5, a docking station 40 for reading the bar code 22 and changing the reflective state of the electronically writable return reminder tag 10 located on the surface of a rental item 30 is shown. The rental item or the return tag includes locating features, such as a pair of perpendicular edges that can be used to accurately positions the return tag 10 with respect to the docking station 40. The docking station 40 includes complementary locating features such as a surface 45 and a pair of perpendicular alignment edges 35 against which the rental item can be urged. A plurality of contact pins 50 protrude from the surface 45 to contact the conductive pads 12 of the tag 10 on rental item 30 when the rental item 30 is placed on surface 45 and urged against alignment edges 35.

A bar code scanner 60 viewing through an opening or window 65 can read the bar code information 22. One or more sensors (such as micro switches) 55 are located in the alignment edges 35. When properly located, a signal from the sensors 55 can be employed to activate an indicator 70 (such as an LED) to show the proper placement is achieved for scanning the bar code information 22 and applying electrical signals to the contact pins 50 to change the state of the display 15. A circuit board 75 with drive electronics for processing signals from the sensors applies signals to the indicator 70 and the contact pins 50 is included in docking device 40.

Figure 6:
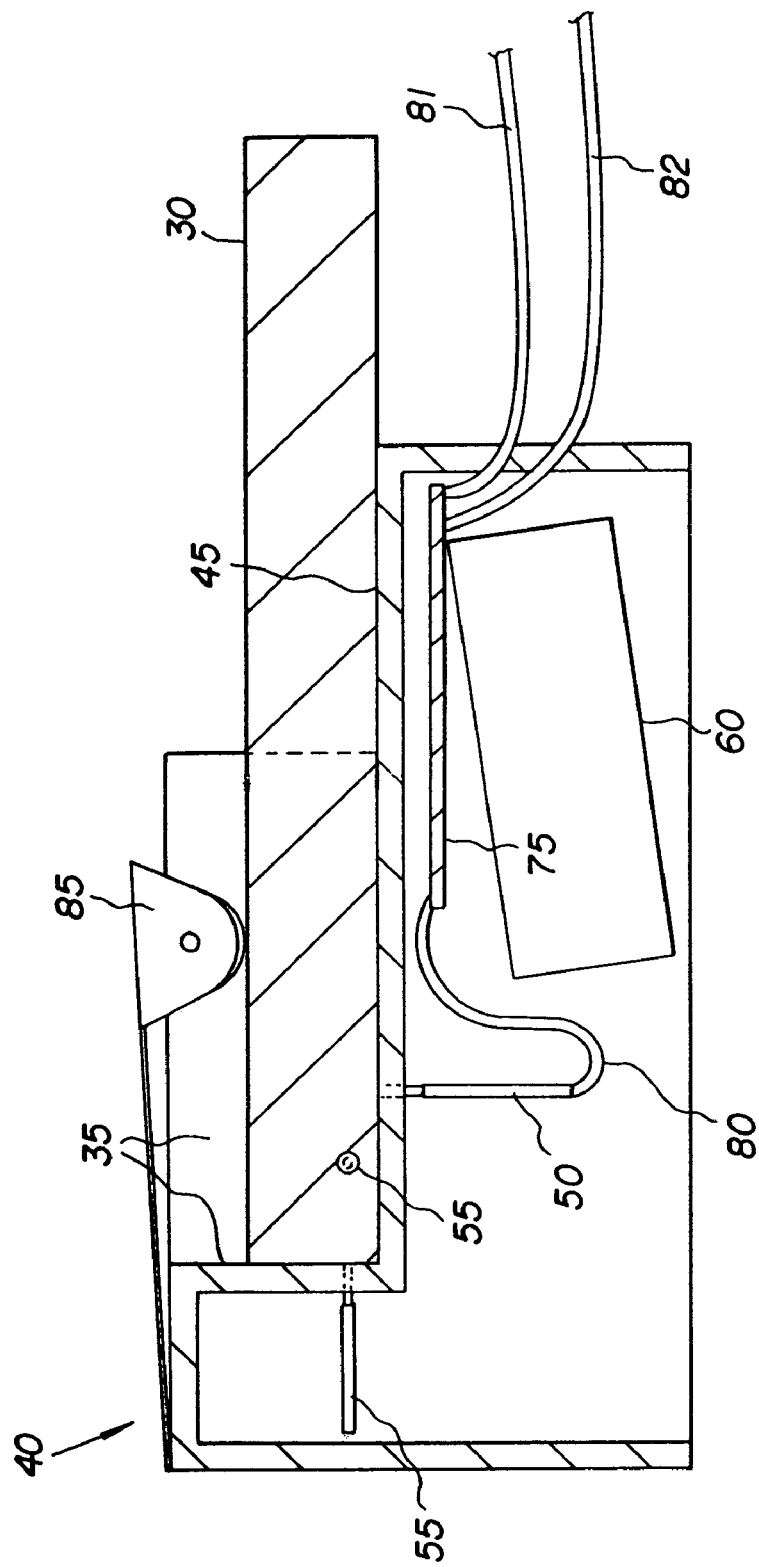
FIG. 6 is a cross sectional view of the docking device of FIG. 5, taken along line 6—6.

As shown in FIG. 6, a biasing spring with a roller 85 are used to apply downward force to the rental item 30 to bias the rental item onto surface 45 of docking device 40 as the rental item is urged into contact with alignment edges 35. The circuit board 75 and the bar code scanner 60 are connected to a power cable 81 and a communications cable 82.

Figure 7:
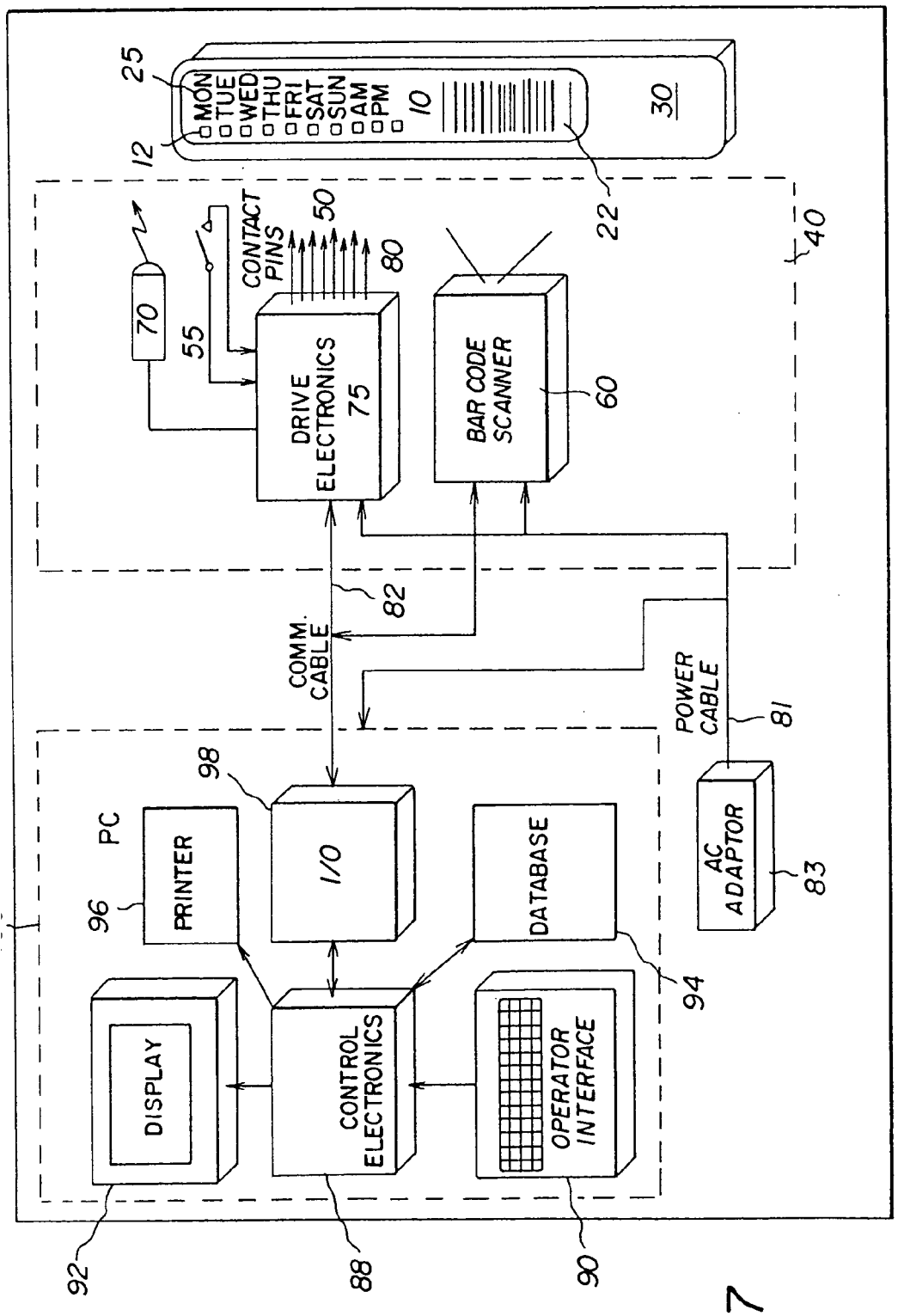
FIG. 7 is a schematic block diagram of an inventory control system for rental items according to the present invention.

Referring to FIG. 7, an inventory control system for rental items includes control electronics 88 connected to an operator interface, such as a keyboard 90, a display 92, a database 94, a printer (such as a laser or ink-jet printer) 96, and an input/output interface 98. The control electronics, display, database, printer, input output interface, and operator interface may comprise for example a personal lap top computer system 100. Printer 96 is used to print the bar codes and other information, such as title or rental outlet identification on the return reminder tags prior to affixing the tags to the rental items. The input output interface 98 is connected to the drive electronics 75 and bar code scanner 60 in docking station 40 by a communications cable 82. DC power is provided to the lap top computer system 100 and docking station 40 by an AC adapter 83.

In operation, an operator first prints bar code and other identifying information on a sheet of return reminder tags using computer system 100. The bar codes associated with the identities of individual rental items are stored in data base 94. The operator then affixes the return reminder tags to a predetermined location on the respective rental items, for example by using an alignment template. When an item is rented, the operator inserts the rental item bearing the return reminder tag into the docking station and urges the item against the alignment edges 35 of the docking station.

When sensors 55 indicate that the rental item is properly seated in the docking station 40, the bar code scanner 60, scans the bar code information on return reminder tag 10 through opening 65 in the docking station 40. The signal read by the bar code scanner is sent to the control electronics 88 where the identification of the rental item is retrieved and displayed on display 92. The operator indicates to the control electronics via operator interface 90 whether the transaction is a rental or a return.

If the transaction is a return, the control electronics 88 sends a signal to the docking station 40 to erase the day and time information on the return reminder tag 10, and updates the inventory database showing that the item has been returned and is available for renting. If the transaction is a rental, the control electronics 88 retrieves rental duration information stored with the identification of the rental item (for example, a two or a five day rental) or a rental duration input by the operator, calculates a return day and time (i.e. AM or PM) and sends a signal to the docking station 40 for writing the return day and time on the rental reminder tag.

In the docking station 40, when the contact pins 50 are in position to make contact with conductive pads 12 on rental reminder tag 10, as indicated by the position sensors 55, the appropriate electronic signals for erasing or writing the return day and time are sent via wires 80 from the circuit board 75 to contact pins 50 to change the reflective state of character elements 25 on the return reminder tag 10. The rental item is then removed from the docking station and returned to stock or given to the customer.

The invention has been described in detail with particular reference to certain preferred embodiments thereof, but it will be understood that variations and modifications can be effected within the spirit and scope of the invention.

PARTS LIST 5 die cut label
10 return reminder tag
12 conductive pads
15 display element
20 printable sheet
22 printed bar code
25 display characters
30 rental item
35 alignment edges
40 docking station
45 surface
50 contact pins
55 sensor
60 bar code scanner
65 opening for bar code scanner
70 indicator
75 circuit board with drive electronics
80 wiring to contact pins
81 power cable
82 communication cable
83 AC adapter
85 biasing spring with roller
88 control electronics
90 operator interface
92 display
94 database
96 printer
98 input/output interface
100 laptop computer system

What is claimed is:

1. An inventory control system for rental items, comprising:
    a) an electronically writable, unpowered return reminder tag located on a surface of a rental item at a predetermined location, the unpowered return reminder tag including an electronically writable bistable display, a machine readable code identifying the rental item, and a plurality of conductive pads located on the front side of the tag for writing to the display;
    b) a docking station having a body defining a surface for supporting the surface of the rental item bearing the unpowered return reminder tag, and a pair of perpendicular alignment edges arranged with respect to the surface of the docking station to align the rental item with respect to the surface of the docking station; a scanning aperture located in the surface of the docking station for accessing the machine readable code on the unpowered return reminder tag; a plurality of contact pins located on the surface of the docking aperture for contacting the conductive pads of the unpowered return reminder tag;

c) a data base containing an inventory of rental items;

d) an operator interface for an operator to indicate a check in or check out condition; and e) control electronics connected to the docking station, the data base and the operator interface, the control electronics being responsive to a check in signal from the operator interface for reading the machine readable code and updating the database to indicate that the rental item has been checked in, and responsive to a check out signal from the operator interface for applying appropriate voltages to the contact pins for writing to the display on the unpowered return reminder tag and for updating the database to show that the item has been checked out.

2. The inventory control system claimed in claim 1, wherein the docking station includes a sensor for sensing when the body of a rental item is correctly located in the docking station.

3. The inventory control system claimed in claim 1, wherein the docking station further comprises a visual display to indicate to an operator when an item is properly located in the docking station.

4. The inventory control system claimed in claim 1, wherein the operator interface includes a graphic user interface having a visual display to indicate to an operator when an item is properly located in the docking station and wherein the control electronics further comprise means to display an image of the rental item on the graphic user interface.

5. The inventory control system claimed in claim 1, wherein the electronically writable bistable display displays a day and time for return of the rental item.

6. The inventory control system claimed in claim 1, wherein the database, the operator interface and the control electronics comprise a personal computer.

7. The inventory control system claimed in claim 1, wherein the rental item is a video cassette recording, video game or DVD.

8. The inventory control system claimed in claim 1, further comprising a printer for printing the machine readable code on the electronically writable return tag.

9. The inventory control system claimed in claim 8, wherein the printer is adapted to print other information on the return tag.

10. A docking station for reading and writing an electronically writable, unpowered return reminder tag located on a surface of a rental item at a predetermined location, the unpowered return reminder tag including an electronically writable bistable display, a machine readable code identifying the rental item, and a plurality of conductive pads located on the front side of the tag for writing to the display, comprising:

a) a body defining a surface for supporting the surface of the rental item bearing the unpowered return reminder tag;

b) a pair of perpendicular alignment edges arranged with respect to the surface of the docking station to align the rental item with respect to the surface of the docking station;

c) a scanning aperture located in the surface of the docking station for accessing the machine readable code on the unpowered return reminder tag; and d) a plurality of contact pins located on the surface of the docking aperture for contacting the conductive pads of the unpowered return reminder tag.

11. The docking station claimed in claim 10, further comprising a sensor for sensing when the rental item is correctly located in the docking station.

12. The docking station claimed in claim 10, further comprising means for biasing the rental item into the surface of the docking station.

13. The docking station claimed in claim 10, wherein the docking station further comprises a visual display to indicate to an operator when an item is properly located in the docking station.

14. An inventory control system for rental items, comprising:

a) an electronically writable, unpowered return reminder tag located on a rental item, the rental item or the unpowered return reminder tag having locating features and the unpowered return reminder tag including an electronically writable bistable display, a machine readable code identifying the rental item, and a plurality of conductive pads located on the front side of the tag for writing to the display;

b) a docking station having a body defining complementary locating features for locating the rental item with respect to the docking station, a scanner for scanning the machine readable code on the unpowered return reminder tag; a plurality of contact pins for contacting the conductive pads of the unpowered return reminder tag;

c) a database containing an inventory of rental items; and d) control electronics connected to the docking station and the database, for reading the machine readable code and updating the database to indicate that the rental item has been checked in, for applying appropriate voltages to the contact pins for writing to the display on the unpowered return reminder tag, and for updating the database to show that the item has been checked out.

15. The inventory control system for rental items claimed in claim 14, further comprising an operator interface connected to the control electronics for an operator to indicate a check in or check out condition, and the control electronics being responsive to an indicated check in condition to updating the database to indicate that the rental item has been checked in, and responsive to an indicated check out condition to applying appropriate voltages to the contact pins for writing to the display on the unpowered return reminder tag, and for updating the database to show that the item has been checked out.

16. The inventory control system claimed in claim 15, wherein the operator interface includes a graphic user interface having a visual display to indicate to an operator when an item is properly located in the docking station and wherein the control electronics further comprise means to display an image of the rental item on the graphic user interface.

17. The inventory control system claimed in claim 15, wherein the database, the operator interface, and the control electronics comprise a personal computer.

18. The inventory control system claimed in claim 14, wherein the docking station includes a sensor for sensing when the body of a rental item is correctly located in the docking station.

19. The inventory control system claimed in claim 14, wherein the docking station further comprises a visual display to indicate to an operator when an item is properly located in the docking station.

20. The inventory control system claimed in claim 14, wherein the electronically writable bistable display displays a day and time for return of the rental item.

21. The inventory control system claimed in claim 14, wherein the rental item is a video cassette recording, video game, or DVD.

22. The inventory control system claimed in claim 14, further comprising a printer for printing the machine readable code on the electronically writable return tag.

23. The inventory control system claimed in claim 22, wherein the printer is adapted to print other information on the return tag.

24. The inventory control system claimed in claim 14, wherein the locating features on the rental item or the return reminder tag are a pair of perpendicular edges and the complementary locating features are a surface on the body of the docking station and a complementary pair of perpendicular edges.

25. A docking station for reading and writing an electronically writable, unpowered return reminder tag located on a surface of a rental item, the rental item or the unpowered return reminder tag having locating features and the unpowered return reminder tag including an electronically writable bistable display, a machine readable code identifying the rental item, and a plurality of conductive pads located on the front side of the tag for writing to the display, comprising:

a) a body defining complementary locating features for locating the rental item bearing the unpowered return reminder tag with respect to the docking station;

b) a scanner for scanning the machine readable code on the return reminder tag; and c) a plurality of contact pins for contacting the conductive pads of the unpowered return reminder tag.

26. The docking station claimed in claim 25, wherein the locating features on the rental item or the return reminder tag are a pair of perpendicular edges and the complementary locating features are a surface on the body of the docking station and a complementary pair of perpendicular edges.

27. The docking station claimed in claim 26, further comprising means for biasing the rental item into the surface of the docking station.

28. The docking station claimed in claim 25, further comprising a sensor for sensing when the rental item is correctly located in the docking station.

29. The docking station claimed in claim 25, further comprising a visual display to indicate to an operator when an item is properly located in the docking station.

* * * * *